July 2, 1935.  R. H. ROSENBERG  2,007,134
VEHICLE CONSTRUCTION
Filed April 29, 1933  5 Sheets-Sheet 2

INVENTOR.
RALPH H. ROSENBERG.
BY
ATTORNEY.

July 2, 1935.  R. H. ROSENBERG  2,007,134
VEHICLE CONSTRUCTION
Filed April 29, 1933   5 Sheets-Sheet 3

INVENTOR.
RALPH H. ROSENBERG.
BY
ATTORNEY.

July 2, 1935.  R. H. ROSENBERG  2,007,134
VEHICLE CONSTRUCTION
Filed April 29, 1933   5 Sheets-Sheet 4
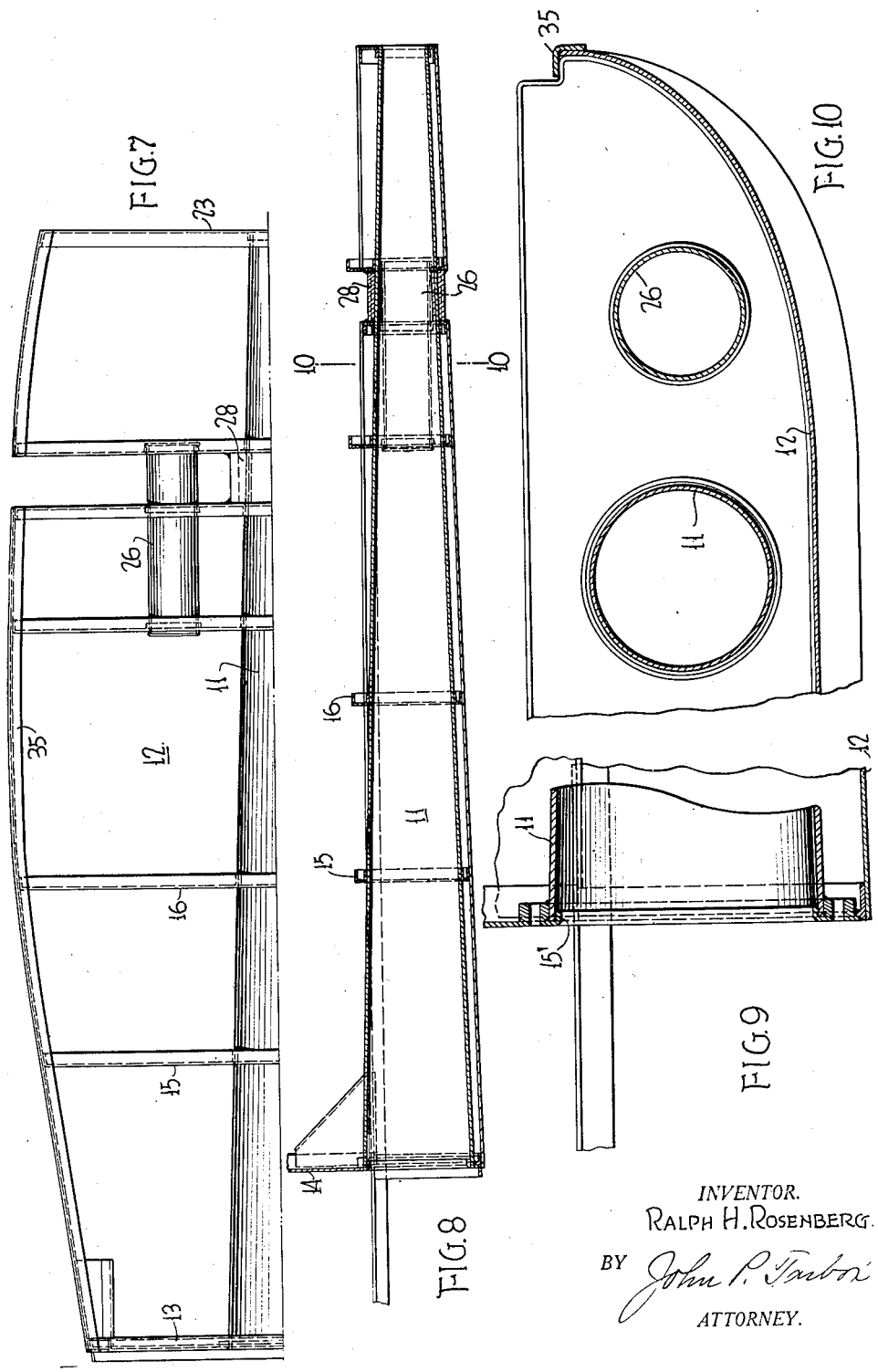
INVENTOR.
RALPH H. ROSENBERG.
BY
ATTORNEY.

July 2, 1935.  R. H. ROSENBERG  2,007,134
VEHICLE CONSTRUCTION
Filed April 29, 1933  5 Sheets-Sheet 5
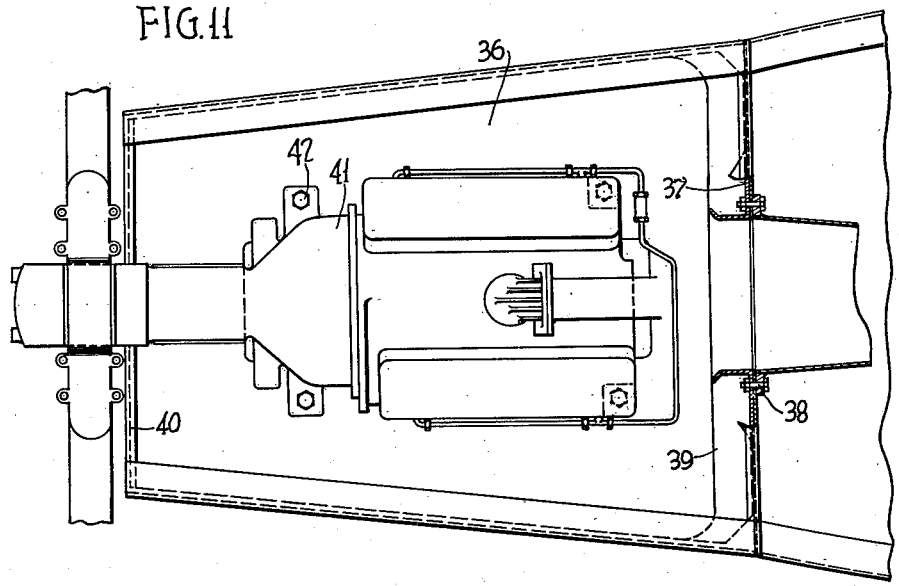
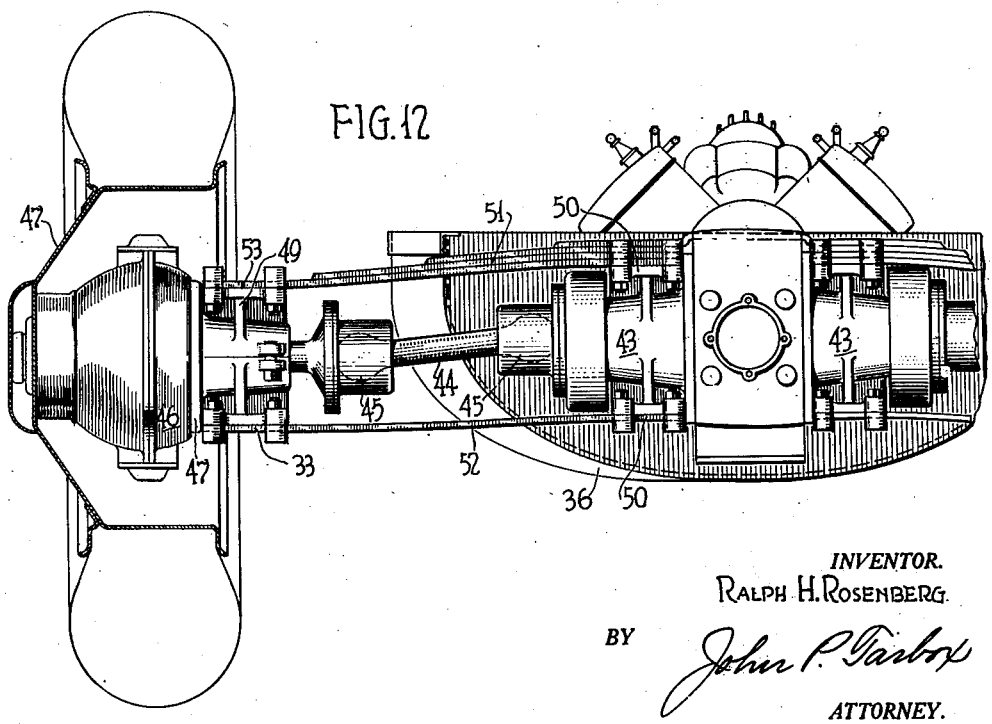
INVENTOR.
RALPH H. ROSENBERG.
BY
ATTORNEY.

Patented July 2, 1935

2,007,134

UNITED STATES PATENT OFFICE 2,007,134

VEHICLE CONSTRUCTION

Ralph H. Rosenberg, Detroit, Mich., assignor to Edward G. Budd Manufacturing Company, Philadelphia, Pa., a corporation of Pennsylvania Application April 29, 1933, Serial No. 668,481

13 Claims. (Cl. 280—106.5)

The invention relates to chassis construction and particularly to chassis construction adapted to be utilized in cars having a front wheel drive.

Among the objects of my invention, is to provide a chassis construction of very light weight, consistent with the strength required in such structures and also to provide a chassis having a very low center of gravity and low wind resistance, and to provide a novel unit construction for such chassis structure.

I attain these objects by constructing a chassis, for the most part, of relatively light gauge sheet metal including a central longitudinal tubular reinforcing member, and a substantially continuous bottom wall of transversely curvilinear form, having its greatest depth in the region of the dash where the greatest bending strains are liable to occur, due to the peculiar spring suspension used. The side edges of this curved bottom wall conform substantially to the side edges of the body adapted to be supported from the chassis. The center longitudinal reinforcing member is interbraced with the bottom wall through a number of spaced transverse plates secured to the tubular member and body wall, forming therewith a rigid truss structure. The upper portions of certain of these transverse plates are formed to support the seats and flooring so that the greater portion of the combined live-load of the combined body and chassis is borne by the chassis construction and arranged to have a very low center of gravity which is conducive to easy riding qualities. To add to the transverse strength in the region of the dash, I form the dash extending upwardly above the chassis as one of these transverse stiffening plates and as a forward limit of the rear unit of improved chassis construction. The forward unit comprises the motor-carrying unit from the extreme forward end of which are sprung the front wheels, which are the driven wheels. This forward unit comprises a bottom wall of transverse curvature, corresponding to the rear portion of the chassis, but tapering in depth from the rear to the front. This unit is reinforced by a rear transverse wall which is strongly connected with the front transverse wall of the rear unit of the chassis.

Another feature of the invention comprises the independent suspension of the front and rear wheels from the main central longitudinal reinforcing member of the chassis by transverse cantilever springs. To accommodate the rear springs, the chassis is specially reinforced in this region by additional longitudinal reinforcing members extending between certain of the transverse reinforcing plates in this region.

Other and further objects and advantages and the means by which they are attained will become apparent from the following detailed description when read in conjunction with the accompanying drawings, in which Figure 1 is a plan view of a chassis and wheel suspension according to the invention.

Fig. 7 is a plan view of one-half of the rear unit with the springs omitted.

Fig. 8 is a central vertical longitudinal sectional view of the same.

Fig. 9 is an enlarged fragmentary view of the forward portion of Fig. 8.

Fig. 10 is an enlarged transverse sectional view taken approximately on the line 10—10 of Fig. 8.

Fig. 11 is a plan view of the forward portion of the chassis showing the front motor unit in place.

Fig. 12 is a partial front elevational view on an enlarged scale of the motor unit and the drive to the front wheels, showing the body of the wheel in section.

Figure 1:
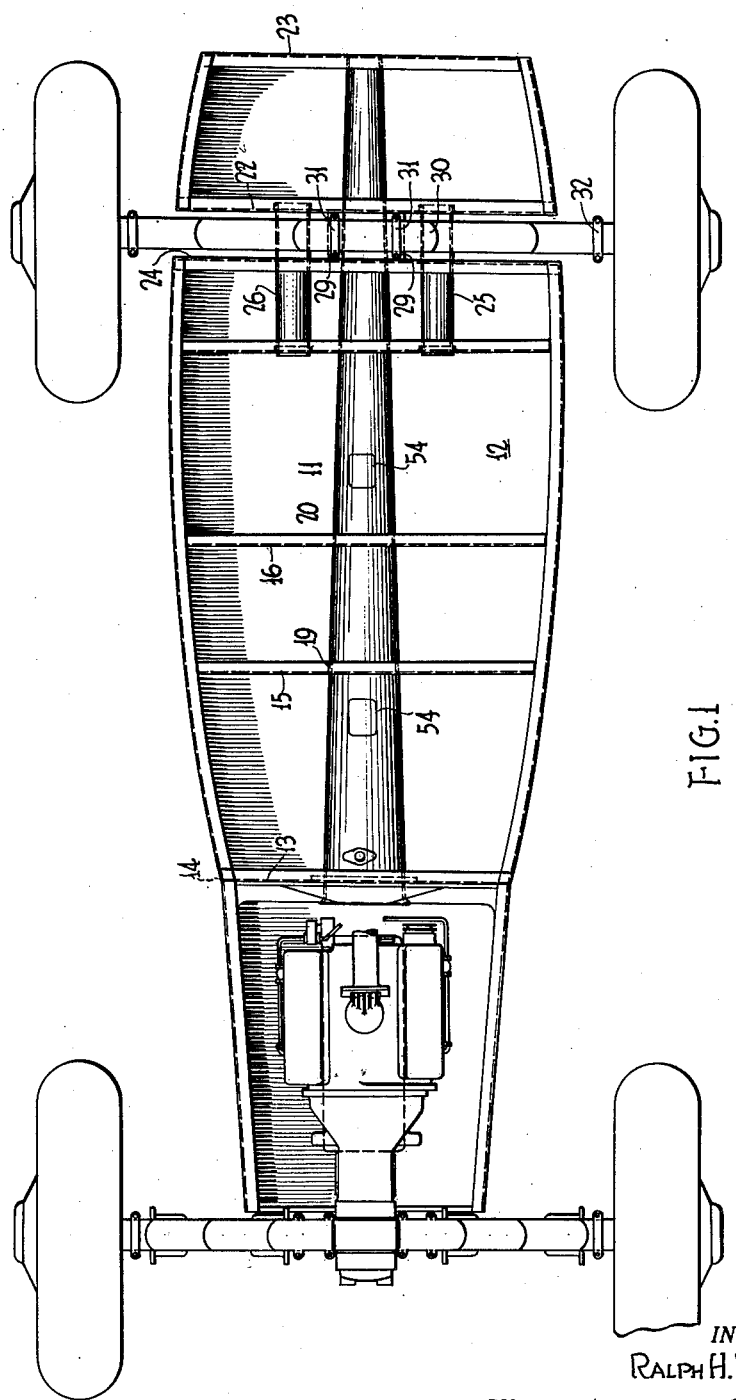
Figure 2:
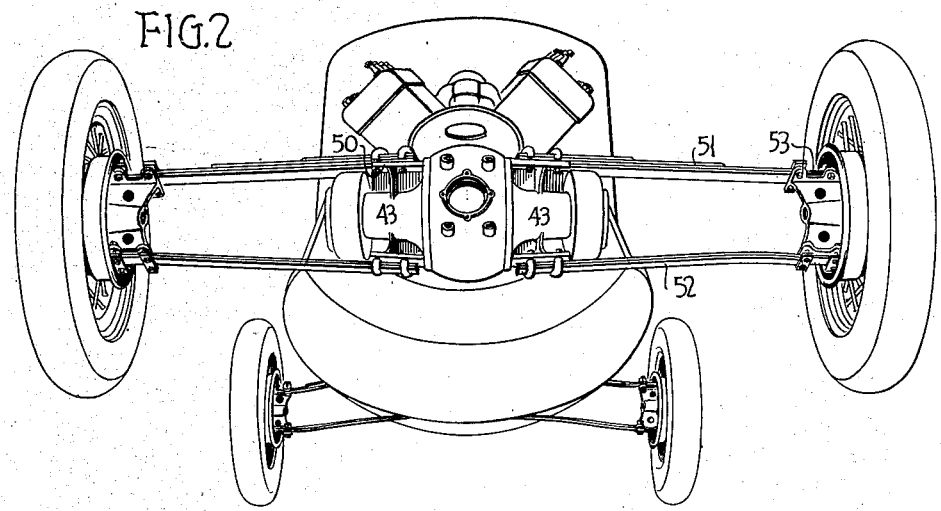
Fig. 2 is a front perspective view, as seen from below, of the same.
Figure 3:
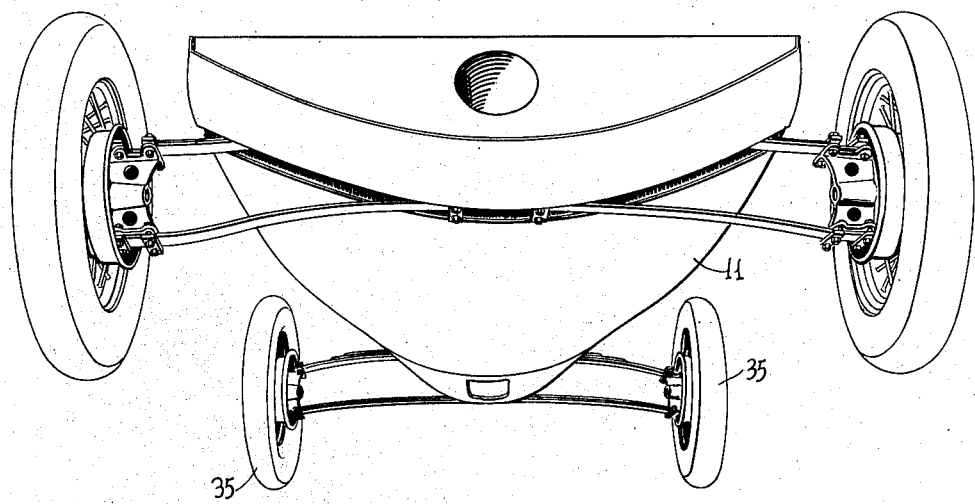
Fig. 3 is a similar rear perspective view of the same.
Figure 4:
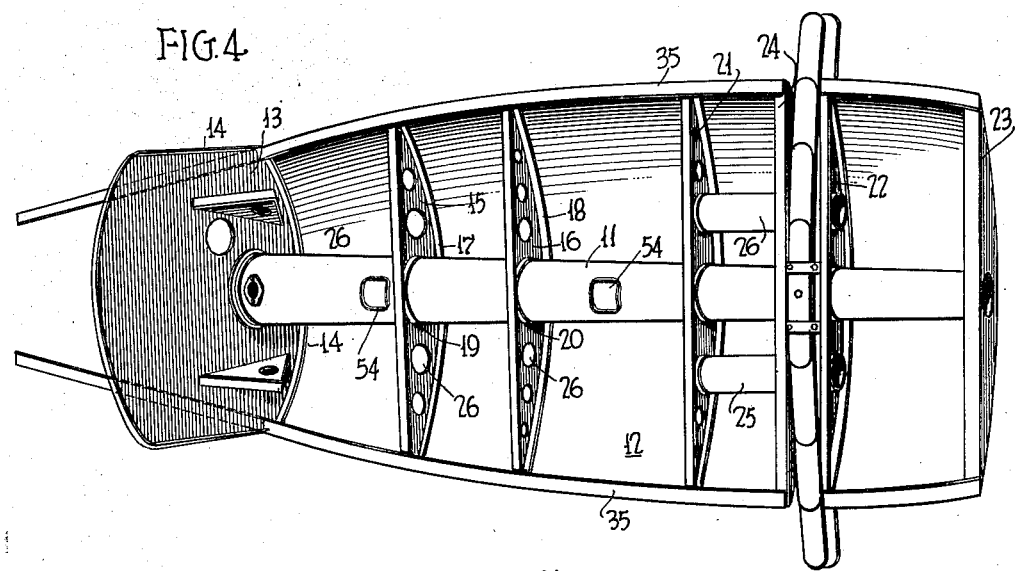
Fig. 4 is a top view in perspective, of the rear unit of the chassis, with the rear springs shown mounted in place.
Figure 6:
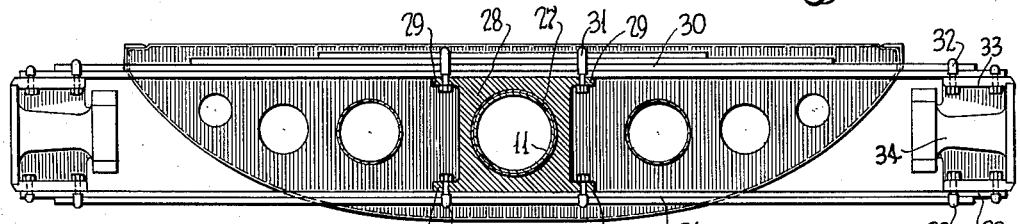
Fig. 6 is a transverse sectional view on the line through the rear spring suspension, showing the springs and the rear mounting brackets in elevation.
Figure 5:
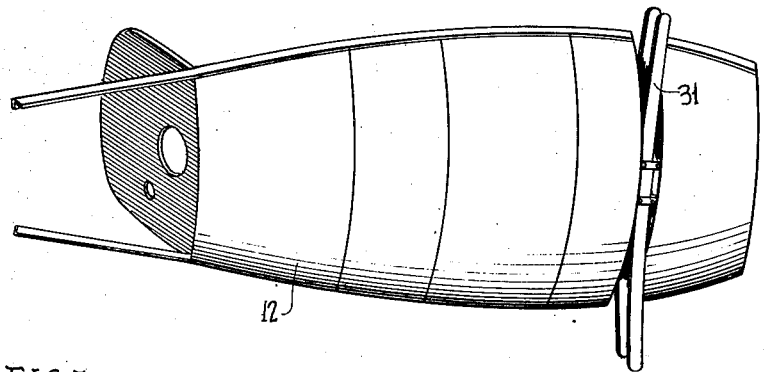
Fig. 5 is a bottom view in perspective, of the same.

According to the invention, the rear unit which forms the greater portion of the length of the chassis, having its main body portion extending from the dash of the vehicle to the rear, back of the rear wheel suspension and which is shown in detail in Figs. 4 to 10 inclusive, comprises a main strength-giving central member 10 of tubular form extending from end to end of the unit. This tubular member is tapered from front to rear to provide the greatest strength where it is needed in view of the cantilever suspension of the chassis from the wheels. The central member is located within a downwardly convex bottom wall 12 which is continuous from end to end, except where its continuity is broken by the rear wheel suspension. The side edges of this bottom wall conform with the contour of the side edges of the body, adapted to be mounted on the chassis, and are substantially at the level of the flooring. This curvilinear bottom wall is likewise formed of its greatest depth at the front as clearly appears in Fig. 8, and tapers in depth toward the rear.

The tubular member 11 and the bottom wall 12 are rigidly joined together transversely by a plurality of longitudinally spaced transverse sheet metal plates.

The forward one 13 of these plates comprises the dash rising above chassis structure and conforming in its edges to the conformation of the front edge of the body adapted to be mounted on the chassis. It is flanged in its edges at 14 and this flange 14 where it overlaps the bottom wall 12, is rigidly secured thereto as by welding. The dash 13 is formed with an opening in line with the opening of the tube 11 and flanged inwardly at 15, see Fig. 9, against the inside of the tube and securely welded thereto.

Rearwardly of the dash substantially in the region of the front seat, are located two transverse plates 15 and 16 likewise flanged in their edges and secured to their bottom flanges as 17 and 18 to the bottom wall 12, and through flanges 19 and 20 surrounding openings receiving the tube 11, to the tube. The flanged top faces of these members rising somewhat above the general plane of the side edges of the chassis as clearly appears in Figs. 8 and 10, are adapted to directly support the front seat structure thereon. Similar transverse cross members 21 and 22 are provided in the rear portion of the chassis for supporting the rear seat structure and interbracing the bottom wall and tubular member. A similar cross member 23 is provided at the extreme rear of the chassis.

Just forwardly of the cross member 22, the bottom wall of the chassis is broken to provide a space for the attachment of the rear wheel suspension. Forwardly of this space, the transverse plate member 24 additionally interbraces the bottom wall 12 and central tubular member 11.

To strengthen the chassis in this region where the bottom wall is broken, I provide tubular reinforcing members 25 and 26 arranged on opposite sides of the central member 11 and extending from the cross member 21 through the cross member 24 to the cross member 22 and rigidly secured to each of these members. These members 25 and 26 in effect, take the place of the bottom wall at the transverse break therein, in strengthening and reinforcing the chassis in this region.

The transverse members are provided with openings 26 which serve to lighten them and also to provide passages for various control and other devices, such as are ordinarily associated with the chassis of the vehicle.

To provide for the rear wheel mounting, the central tube 11 is reinforced in the space receiving the rear suspension, by a tubular reinforcement 27, over which is secured a mounting block 28, having flat upper and lower surfaces and lateral lugs and flanges 29. This block is strongly secured to the tubular member by welding the parts together. On opposite sides of this block the tubular member is strongly secured to the transverse members 24 and 22 against tortional strains. The rear of the chassis is sprung from the rear wheels by upper and lower semi-elliptic cantilever springs 30 and 31 having their central portions clamped by the U-clamps 31 to the lugs 29 and their outer ends clamped through U-clamps 32 to flanges 33 formed on the bearing brackets 34 mounting the wheels 35. The wheels so connected to the chassis are individually sprung through parts of quarter-elliptic springs. The springs are of sufficient width to transmit torque and braking strains to the chassis without any other connection of the wheel bearing brackets to the chassis. If desired, however, the wheel bearing brackets can be additionally secured to the chassis by the usual torque rod extending between the wheel bearing and a transverse member, such as member 16 of the chassis construction.

The side edges of the chassis so fabricated, are reinforced by angle members 35 having one arm overlap the bottom wall 12 at its edge and secured thereto and the other arm overlapping the transverse reinforcing members and secured thereto. This angle member forms a convenient seating for the body super-structure and is extended forwardly beyond the dash to co-operate with the upper side edges of the motor unit to be described and to form a lateral bracing connection between the motor unit and the rear unit of the chassis.

The motor unit preferably comprises a transversely dished frame body 36 such as light metal casting having the bottom wall curved to conform substantially to the bottom wall of the rear unit and having a rear wall 37 adapted to fit in abutting relation with the forward wall of the rear unit and secured thereto as by bolts 38. The rear and bottom walls of the casting are suitably reinforced by ribbing 39 to give it strength. The motor unit frame also includes the vertical forward wall 40, rigidly secured to the curved side and bottom wall. The curved bottom wall of the motor unit merges into the curved forward portion of the rear unit and decreases in depth toward the front so that the bottom wall of the chassis, from extreme front to extreme rear, is in effect convex longitudinally and transversely, the greatest depth of the convexity in the longitudinal direction being substantially in the region of the joinder of the motor and rear units where it is most strongly reinforced transversely by the overlapping double-walled construction effected by the joinder of the two units through their end walls.

The bottom of the motor unit frame casting is formed with horizontal seating portions adapted to fit mounting portions of the combined motor, transmission and differential unit 41, this latter unit being securely fastened to the casting by the bolts 42. The motor, transmission and differential unit may consist, in large part, of a single casting or if desired, of several castings securely bolted together to house the various portions of the transmission and differential in direct alignment with the forward portion of the motor casing. The forward end of this unitary motor transmission and differential housing extends forwardly of the forward wall of the casting 36 and is adapted to form the connection to the wheels so that the combined effect of the motor, transmission and differential casing and the casting is to extend the chassis forward, as to form a continuation to the extreme forward end of the chassis of the central main reinforcing member of the chassis. The chassis is thus suspended in cantilever fashion between the front and rear wheel suspensions and the construction is such, as to give the effect of a cantilever beam in which the greatest strength against deflection is provided at the point intermediate the wheel suspensions, at which the greatest live and dead load is likely to be concentrated, namely in the region of the dash of the vehicle.

The forward portion of the motor, transmission and differential housing which projects beyond the forward wall of the chassis 40, houses the differential and has lateral projections 43, housing the inner end of the drive shafts. Drive shafts 44 which are connected to drive the wheels through universal joints 45 and gearing, not shown arranged within the outer spherical bearing portion 46 connected to the wheel and the inner spherical portion 47 on the wheel supporting bracket member 48. The lateral projections 43 have flat surfaces 50, one at the top and one at the bottom to which the inner ends of the upper and lower quarter-elliptic cantilever springs 51 and 52 are rigidly bolted and the wheel supporting bracket portion 49 has similar surfaces 52, 53 against which the outer ends of the springs are bolted. By this arrangement the front wheels are individually sprung directly from the motor unit and in a way to facilitate the transmission of the drive to the front wheels, since all of these parts, the springs and drive shaft, are arranged in substantially the same vertical plane.

The provision of the main central tube 11 extending from the motor to the rear end of the chassis, provides a space through which the exhaust may be led to the rear. Also, by providing openings as 54, in the top wall of this tube 11, some of the heat generated by the exhaust may be led to the interior of the car body to heat it.

By the construction hereinbefore described in detail, I achieve in a full measure the objects and advantages of the invention. It will be understood however, that numerous changes and modifications may be made from the specific detail described, without departing from the spirit and scope of the invention as set forth in the appended claims and I desire to include all such changes and modifications within the terminology of the claims.

What I claim is:

1. A chassis construction having a main central tubular member extending longitudinally thereof, a transversely and longitudinally convex bottom wall and transverse plates connecting said tubular member and bottom wall at spaced locations.

2. A chassis construction having a main central tubular member tapering from front to rear, a transversely and longitudinally convex bottom wall, and transverse plates connecting said tubular member and bottom wall at spaced locations.

3. A chassis construction having a main central tubular member, a transversely convex bottom wall, rear wheels sprung from said central tubular member, the bottom wall being discontinuous at said spring location, transverse plates connecting said tubular member and bottom wall in front and rear of said spring location, and tubular members connecting said plates on the opposite sides of said central tubular member.

4. A chassis construction having a transversely and longitudinally convex bottom wall, a central reinforcing member extending above and free from said bottom wall, spaced transverse plates interconnecting said reinforcing member and bottom wall, front wheels independently and directly sprung from the front end of said central member, and rear wheels also independently and directly sprung from the rear portions of said central member.

5. A chassis construction having a vertically extending dash, a central tubular member secured to the dash at its forward end and extending to the rear of the chassis, a transversely convex bottom wall extending underneath said central member and above the central member at the sides, an engine mounting bracket secured to said central member and dash and extending the member forwardly of the dash, and front wheels sprung from the front of said engine mounting bracket, the bottom wall of the engine bracket being transversely curved in correspondence with the bottom wall of the chassis in rear of the dash.

6. A chassis having its bottom wall transversely and longitudinally curved, the forward portion of said wall being formed by a hollow engine supporting bracket, an engine, transmission and differential unit supported in said bracket in longitudinal alignment with the differential arranged forwardly, front wheels independently sprung from the front of said engine bracket substantially in the transverse plane of said differential, by vertically spaced springs above and below the axis of the differential, and universally jointed drive shafts extending between said springs to the wheels.

7. A chassis construction comprising a rear unit from which the rear wheels are sprung extending forwardly to the dash, and a front motor carrying unit from which the front wheels are sprung said units being rigidly joined together in the transverse plane of the dash, the combined units having a transverse convex under surface.

8. A chassis construction comprising a rear unit having its main body terminate at the front in the plane of the dash, said unit including a central tubular reinforcing member, a transversely convex bottom wall within the curvature of which said central member is received, transverse plates secured to said central member and bottom wall, and angular edge reinforcing members secured to the side edges of said bottom wall.

9. A chassis construction having a rear unit of hollow downwardly convex form terminating at the front in the dash structure, the curvature being of greatest depth at the front and decreasing gradually toward the rear, and a front unit secured to the forward end of the rear unit of similar downwardly convex form but tapering in depth from rear to front.

10. A chassis construction having a main central tubular member, a transversely convex bottom wall, the bottom wall being discontinuous at a spring location, reinforcing means for the tubular member at said location, wheels sprung from said tubular member and reinforcing means, and transverse plates connecting said tubular member and bottom wall.

11. A chassis construction having a transversely convex bottom wall including a rear section having forward side extensions and a front section secured to said extensions, a main central tubular member extending longitudinally in said rear section, and transverse plates connecting said tubular member and bottom wall.

12. A chassis construction having a transversely convex bottom wall including a rear section having a front dash and forward side extensions, and a front section secured to said extensions, a main central tubular member extending longitudinally from the dash in said rear section, and transverse plates connecting said tubular member and bottom wall.

13. A chassis construction having a main central tubular member extending longitudinally thereof, a transversely convex bottom wall, transverse plates connecting said tubular member and bottom wall, and wheels sprung from the chassis beyond one end of said bottom wall.

RALPH H. ROSENBERG.